US008724755B2

(12) United States Patent
Nakanishi et al.

(10) Patent No.: US 8,724,755 B2
(45) Date of Patent: May 13, 2014

(54) RECEIVING APPARATUS AND RECEIVING METHOD

(75) Inventors: Toshiyuki Nakanishi, Yokohama (JP); Daisuke Takeda, Kawasaki (JP); Tatsuhisa Furukawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 13/237,080

(22) Filed: Sep. 20, 2011

(65) Prior Publication Data
US 2012/0243593 A1 Sep. 27, 2012

(30) Foreign Application Priority Data

Mar. 24, 2011 (JP) ................. 2011-065692

(51) Int. Cl.
H03D 1/06 (2006.01)
H03D 11/04 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl.
USPC ........... 375/348; 375/346; 375/260; 375/349; 375/343; 455/296; 455/303

(58) Field of Classification Search
USPC .......... 375/348, 346, 260, 349, 343; 370/208, 370/330, 210; 455/296, 303
See application file for complete search history.

(56) References Cited

U.S. PATENT DOCUMENTS

| 7,480,235 | B2* | 1/2009 | Fujii et al. ..................... 370/208 |
| 7,860,057 | B2* | 12/2010 | Seki et al. ..................... 370/330 |
| 7,974,372 | B2* | 7/2011 | Yoshida ........................ 375/348 |
| 8,462,900 | B2* | 6/2013 | Iguchi et al. .................. 375/346 |
| 2004/0091057 | A1* | 5/2004 | Yoshida ........................ 375/260 |
| 2006/0029143 | A1* | 2/2006 | Yoshida ........................ 375/260 |
| 2006/0291375 | A1* | 12/2006 | Nishikawa .................... 370/210 |
| 2008/0304589 | A1* | 12/2008 | Tsuruta et al. ................ 375/260 |
| 2010/0080330 | A1* | 4/2010 | Kawauchi et al. ............ 375/348 |

OTHER PUBLICATIONS

Song, Bowei, et al., "On Channel Estimation and Equalization in TDS-OFDM based Terrestrial HDTV Broadcasting System", IEEE Transactions on Consumer Electronics, vol. 51, No. 3, Aug. 2005, pp. 790-797.

* cited by examiner

Primary Examiner — Phuong Phu
(74) Attorney, Agent, or Firm — White & Case LLP

(57) ABSTRACT

A receiving apparatus receives a digital modulation signal. The receiving apparatus has a receiving part for down-converting the digital modulation signal to a baseband signal and to obtain channel estimates, a channel estimation part for estimating a multi-path channel, a first replica generation part for generating a first replica, based on the channel estimates obtained by the channel estimation part, a first replica removal part for removing the first replica from a target frame in the baseband signal, a nulling part for forcefully nulling he baseband signal for at least a portion of the time period where an inter-frame interference occurs due to a delay wave having a delay time longer than the known signal, and a cyclic-addition part for performing cyclic-addition between a front side portion and a rear side portion in the target frame, including the portion nulled by the nulling part.

20 Claims, 16 Drawing Sheets

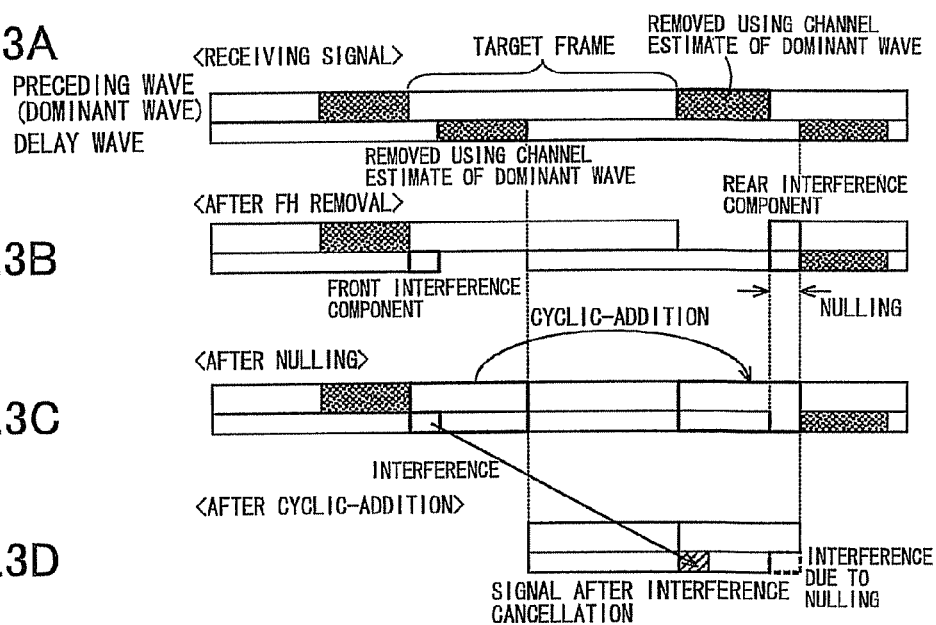
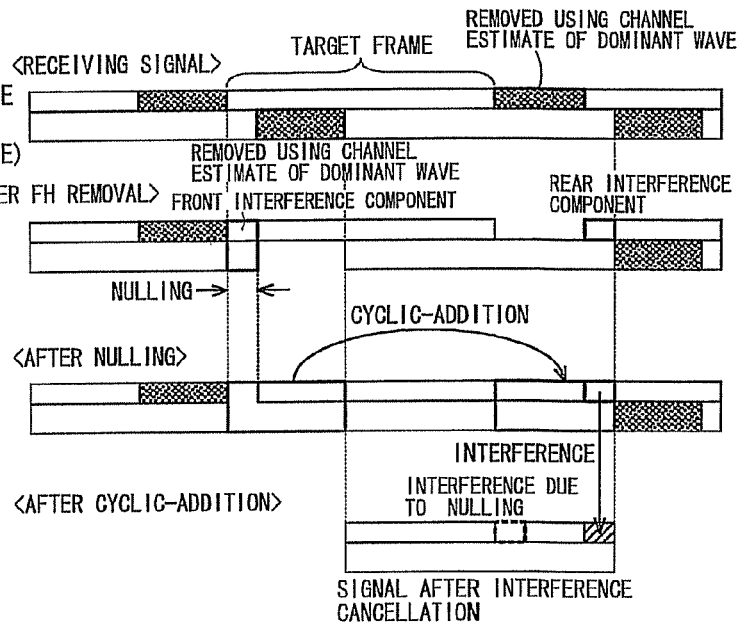

FIG.9A
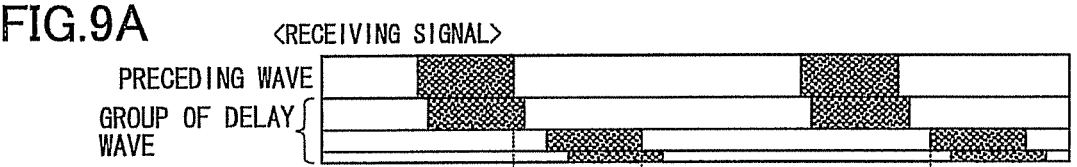
FIG.9B
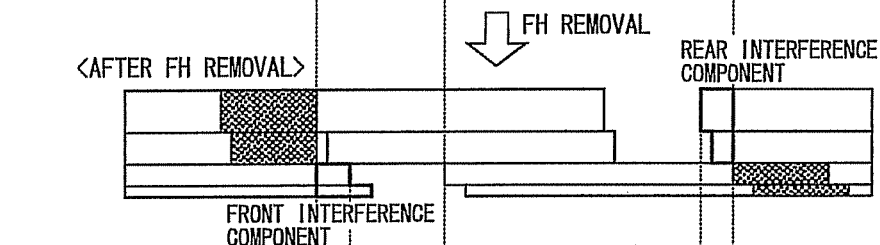
FIG.9C
FIG.9D
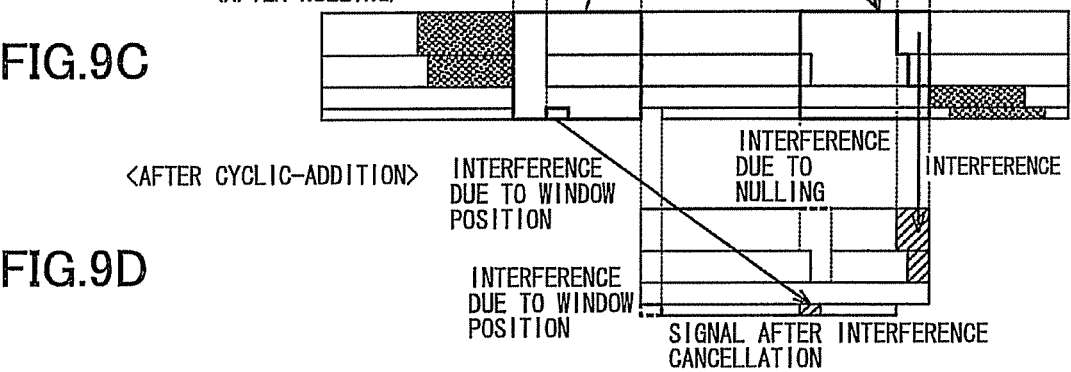

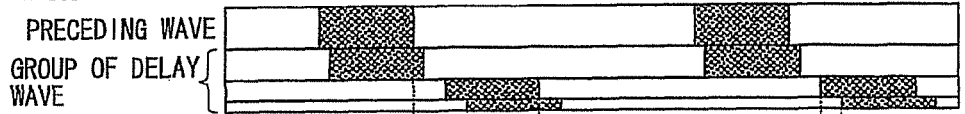
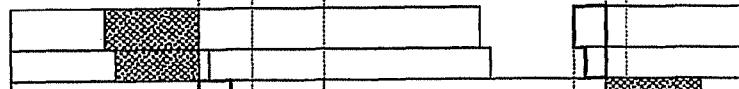
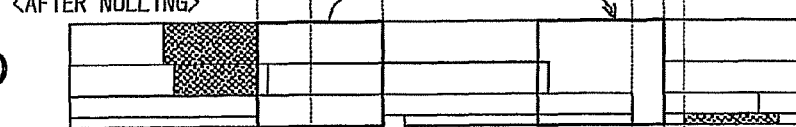
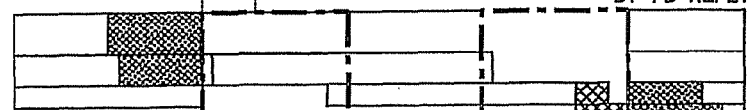
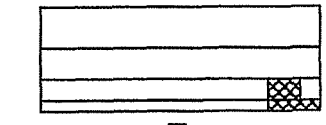

RECEIVING APPARATUS AND RECEIVING METHOD

CROSS REFERENCE TO RELATED APPLICATIONS

This application is based on and claims the benefit of priority from the prior Japanese Patent Application No. 2011-65692, filed on Mar. 24, 2011, the entire contents of which are incorporated by reference herein.

FIELD

The embodiments of the present invention are related to a receiving apparatus and method for receiving a digital modulation signal including a known signal and a data signal within a frame.

BACKGROUND

Methods for transmitting a digital terrestrial broadcast are different for each country. For example, the frame of a digital terrestrial broadcast (DTMB: Digital Terrestrial Multimedia Broadcast) in China is composed of a frame header (FH) which is a known signal and a frame body (FB) which is a subsequent data signal.

Since the FB does not have a mechanism for removing inter-symbol interference (in the case of DTMB, inter-frame interference) such as a guard interval used in many OFDM (Orthogonal Frequency Division Multiplexing) systems, interference due to delay waves in a multi-path channel becomes a problem.

In order to eliminate this problem, a technique has been proposed in which a frame header portion (hereinafter, FH portion), which is a known signal, is removed based on a channel estimate, and the last (or first) portion of a data signal is added to the beginning (or end) to restore the cyclicity of the data signal, thereby enabling demodulation without inter-frame interference.

With this technique, inter-frame interference due to the multi-path channel can be eliminated, but if the maximum delay time of the delay waves exceeds the FH length, inter-frame interference from the adjacent frames occurs. This interference occurs at a constant ratio relative to the desired signal component regardless of the power of the dominant wave and delay wave, and thus no matter how small the power of the delay wave is, if the delay time is large, a large interference will occur.

BRIEF DESCRIPTION OF THE DRAWINGS

FIGS. 3A to 3D are timing diagrams explaining the processing operation of an interference cancellation part 6;

FIGS. 4A to 4D are timing diagrams explaining the processing operation of the interference cancellation part 6 according to a second embodiment;

FIGS. 9A to 9D are timing diagrams of the result of processing by the interference cancellation part 6 according to a fourth embodiment;

FIGS. 15A to 15G are timing diagrams of interference cancellation according to the eighth embodiment.

DETAILED DESCRIPTION

Hereafter, the embodiments of the present invention will be described with reference to the drawings.

A receiving apparatus receives a digital modulation signal including a known signal and a data signal within a frame. The receiving apparatus has a receiving part configured to down-convert the digital modulation signal to a baseband signal, a channel estimation part configured to estimate a multi-path channel based on the baseband signal and to obtain channel estimates, a first replica generation part configured to generate a first replica which is a replica of the known signal included in the baseband signal, based on the channel estimate obtained by the channel estimation part, a first replica removal part configured to remove the first replica from a target frame in the baseband signal, a nulling part configured to forcefully null the baseband signal for at least a portion of the time period where an inter-frame interference occurs due to a delay wave having a delay time longer than the known signal, and a cyclic-addition part configured to perform cyclic-addition between a front side portion and a rear side portion of the target frame, including the portion nulled by the nulling part. Given a signal is a scalar or a vector, nulling a signal means to make the element of a scalar or the elements of the vector zero.

Figure 1:
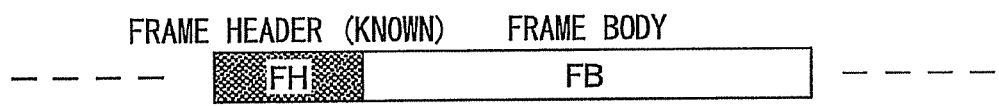
FIG. 1 is a view showing the structure of a frame.

The explanation below will mainly focus on a receiving apparatus for receiving a digital modulation signal including a frame header (FH) which is a known signal and a frame body (FB) which is a subsequent data signal within a frame, as shown in FIG. 1.

First Embodiment

Figure 2:
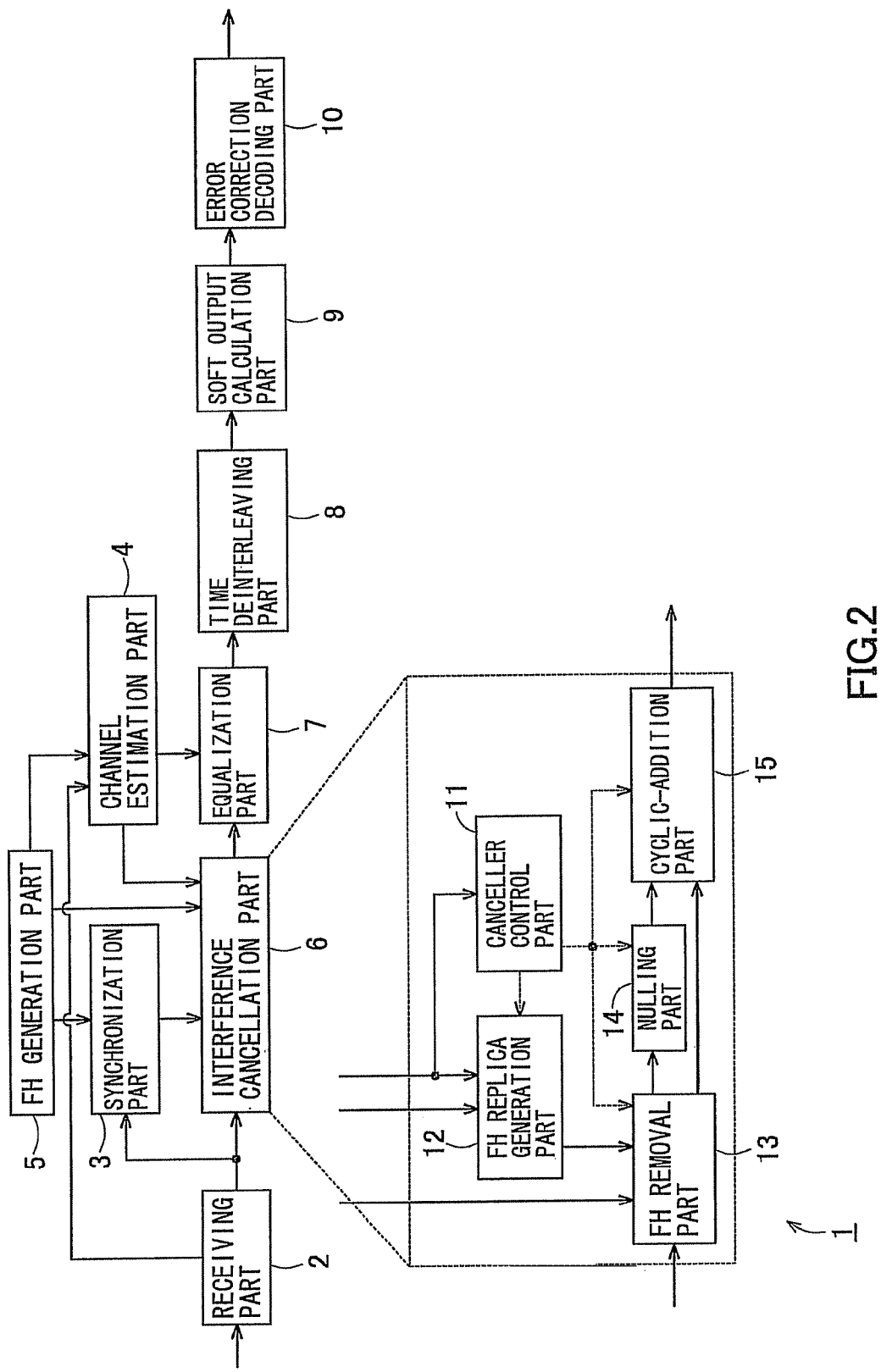
FIG. 2 is a block diagram showing the overall configuration of a receiving apparatus 1 according to a first embodiment.

FIG. 2 is a block diagram showing the overall configuration of a receiving apparatus 1 according to the first embodiment. The receiving apparatus 1 of FIG. 2 includes a receiving part 2, a synchronization part 3, a channel estimation part 4, an FH generation part 5, an interference cancellation part 6, an equalization part 7, a time deinterleaving part 8, a soft output calculation part 9, and an error correction decoding part 10.

The receiving part 2 down-converts a received digital modulation signal to a baseband signal. A receiving filter which extracts a signal of a desired band is provided within the receiving part 2, but this filter is omitted from FIG. 2.

The FH generation part 5 generates a frame header which is a known signal. The synchronization part 3 performs timing synchronization on the baseband signal. For example, the synchronization part 3 estimates the frame timing by performing correlation operation between the signal of the known frame header generated by the FH generation part 5 and the baseband signal, or the like. The channel estimation part 4 estimates a multi-path channel using the baseband signal. For example, the channel estimation part 4 calculates a channel estimate (delay time/amplitude/phase of each path of a multi-path channel) by performing correlation operation between the signal of the known frame header generated by the FH generation part 5 and the baseband signal, or the like. The channel estimate obtained by the channel estimation part 4 is used by the interference cancellation part 6 and the equalization part 7.

As shown in FIG. 2, the interference cancellation part 6 has a canceller control part 11, an FH replica generation part (a first replica generation part) 12, an FH removal part (a first replica removal part) 13, a nulling part 14, and a cyclic-addition part 15.

The canceller control part 11 performs control to remove inter-frame interference within a target frame of the baseband signal. The FH replica generation part 12 generates an FH replica, which is a replica of the frame header, using the channel estimates obtained by the channel estimation part 4 and the frame header generated by the FH generation part 5. The FH removal part 13 removes the frame header from a target frame using the generated FH replica.

The nulling part 14 forcefully nulls the inter-frame interference portion that occurs due to a delay wave having a delay time which is longer than the frame header length within the target frame. The cyclic-addition part 15 performs cyclic-addition of the portion nulled by the nulling part 14 within the target frame.

The equalization part 7 compensates for the influence of the multi-path estimated by the channel estimation part 4 on the signal that is cyclically added by the cyclic-addition part 15. Subsequently, data symbols are deinterleaved with accordance to the interleave pattern applied at transmitter side by the time deinterleaving part 8, and soft metrics of bits are calculated by the soft output calculation part 9. Afterwards, error correction decoding is carried out by the error correction decoding part 10, and a TS (Transport Stream) signal is output. In the case of DTMB for China, error correction is carried out by the error correction decoding part 10 using both LDPC code and BCH code.

In FIG. 2, the processing of the interference cancellation part 6 and the equalization part 7 is carried out for each target frame, but the processing of the time deinterleaving part 8 and the subsequent parts is carried out for each plurality of frames. Therefore, a memory part (not illustrated) for temporarily storing a plurality of frames is provided between the equalization part 7 and the time deinterleaving part 8. The memory part can also be provided to the time deinterleaving part 8.

FIG. 3 shows timing diagrams explaining the processing operation of the interference cancellation part 6. FIG. 3A illustrates an example in which a delay wave is delayed longer than the frame header length relative to a preceding wave (dominate wave). In this, figure, the dot mesh areas are frame headers and the space between adjacent frame headers is the frame body.

In FIG. 3, the height of the preceding wave is larger than the height of the delay wave, and this indicates that the power of the preceding wave is greater than that of the delay wave.

The interference cancellation part 6 removes the frame header by the FH removal part 13 (FIG. 3B). In this process, the FH replica generation part 12 multiplies the known frame header by the channel estimate of a path to generate an FH replica, and then the FH removal part 13 removes this FH replica from the receiving signal for each path. The FH portion to be removed is the FH portion of each path, included in the time period starting from the beginning of the frame body of the most preceding wave to the end of the frame body of the longest delay wave. Here, there is a path for each of the preceding wave and the delay wave.

As shown in FIG. 3B, an inter-frame interference component shown by the bold outlines exists at the front and the rear of the target frame. Thus, in this illustrated example the interference cancellation part 6 forcefully nulls the rear interference component by the nulling part 14 (FIG. 3C). As a result, the rear interference component is removed, but since a portion of the delay wave becomes zero, interference due to nulling is given to the delay wave portion. Further, the front interference component remains as is.

Next, the interference cancellation part 6 cyclically adds the beginning portion in the target frame to the end portion by the cyclic-addition part 15 (FIG. 3D). This cyclic-addition is carried out so that the periodicity is maintained within the target frame. Thereby, it is guaranteed that the preceding wave will be cyclic with no interference. Meanwhile, the front interference component remains as is in the delay wave, and in addition, interference occurs due to nulling, and thus the interference of the delay wave increases. However, in the case that the power of the preceding wave is greater than the power of the interference wave, the resulted interference is less than in a conventional apparatus, and the demodulation performance can be improved.

In FIG. 6, during cyclic-addition, the front portion of the target frame is added to the rear portion, but instead the rear portion of the target frame may be added to the front portion. In this case, the position at which an interference component from the preceding frame appears will change, but the amount of interference will not change. Therefore, in the former case and the latter case, the performance of the interference cancellation part 6 is the same. The sequences of operations are controlled by the canceller control part 11 in the interference cancellation part 6.

The canceller control part 11 controls the operations of the FH replica generation part 12, the FH removal part 13, the nulling part 14, and the cyclic-addition part 15 in response to the delay time of each path based on the channel estimates.

Since nulling is unnecessary if a delay wave exceeding the frame header length does not exist, the canceller control part 11 makes the cyclic-addition part 15 perform cyclic-addition after removal of the FH portion.

In this way, in the first embodiment, if a delay wave exceeding the frame header length exists, nulling is carried out after removal of the FH portion and cyclic-addition is subsequently carried out. Thus, inter-frame interference of a preceding wave whose power is greater than a delay wave can be completely removed.

Second Embodiment

The second embodiment deals with a case where the power of the delay wave is greater than that of the preceding wave, which was not dealt with the first embodiment.

The receiving apparatus 1 according to the second embodiment is composed in the same way as that in FIG. 2, and thus an explanation thereof will be omitted, and the differences from the first embodiment will be mainly explained below.

FIG. 4 shows timing diagrams explaining the processing operation of the interference cancellation part 6 according to the second embodiment. As illustrated, the height of the delay wave is larger than that of the preceding wave, and this shows that the delay wave has the greater power. Therefore, the delay wave is the dominant wave.

The delay wave in FIG. 4A has a delay time exceeding the frame header length, and nulling is carried out in the same way as in the first embodiment.

In the first embodiment, the interference due to the preceding wave which has a greater power, is shifted by nulling to the delay wave which has the smaller power. In contrast, in the present embodiment, since the power relationship is opposite, the performance may deteriorate compared to a conventional apparatus with the same method as shown in FIG. 6.

Therefore, in the present embodiment, the interference component on the front side of the target frame caused by the preceding frame is nulled (FIG. 4C) after FH removal (FIG. 4B), and then cyclic-addition is carried out (FIG. 4D).

Thereby, as shown in FIG. 4C, the interference on the delay wave becomes zero, and interference due to nulling with the rear interference caused by the subsequent frame occurs in the preceding wave whose power is small.

In this way, in the present embodiment, in the case that the delay wave has greater power than the preceding wave and the delay wave has a delay amount exceeding the frame header length, nulling and cyclic-addition are carried out so that the interference on the delay wave becomes zero, and thus the demodulation performance can be improved beyond that of the first embodiment.

Third Embodiment

The third embodiment is a combination of the above-described first and second embodiments, wherein the front interference amount and the rear interference amount are compared and the one with the larger amount of interference is removed.

Figure 5:
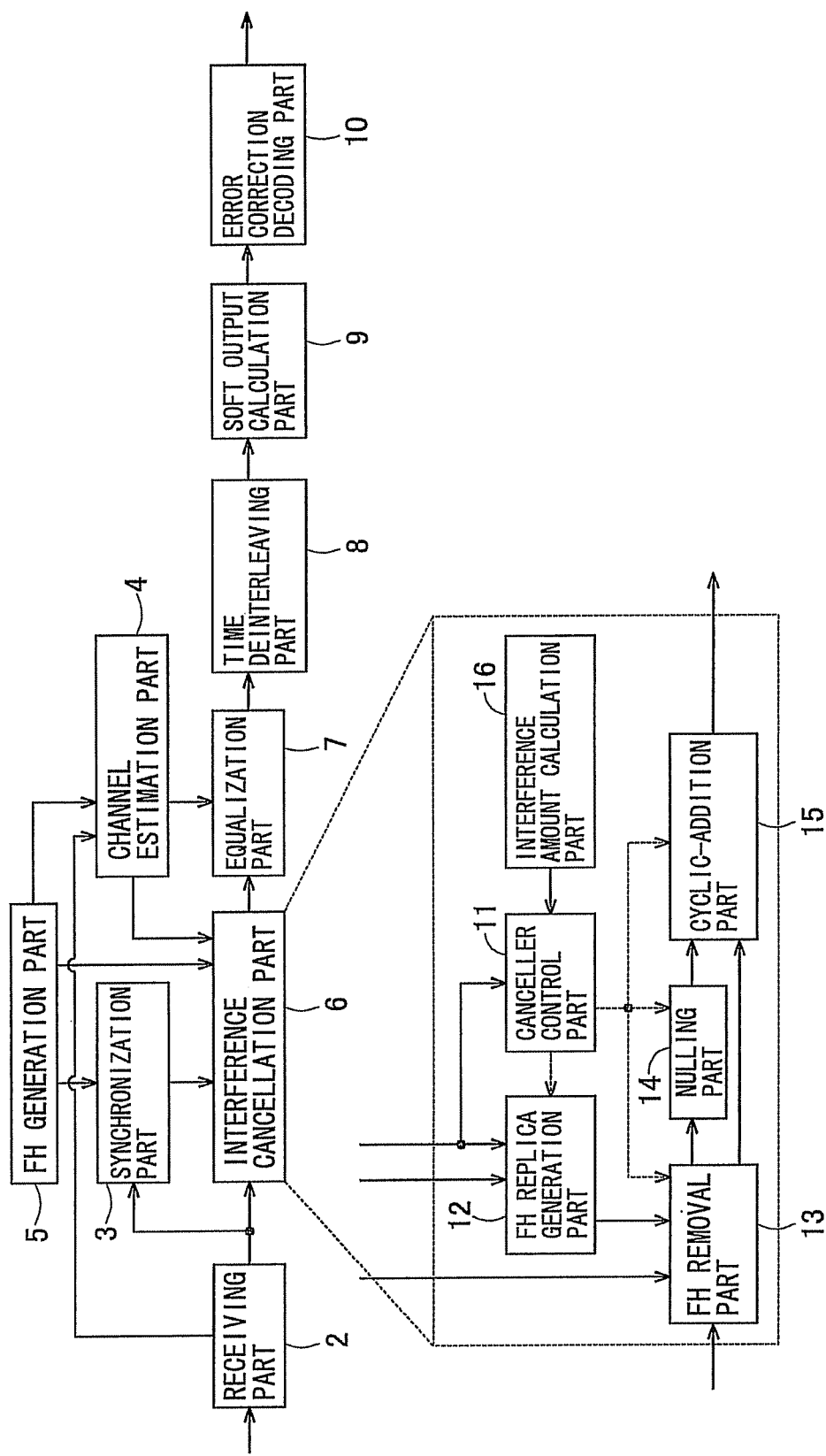
FIG. 5 is a block diagram showing the overall configuration of a receiving apparatus 1a according to a third embodiment.

FIG. 5 is a block diagram showing the overall configuration of a receiving apparatus 1a according to the third embodiment. The constituent parts in FIG. 5 which are the same as those of FIG. 2 are given the same reference numerals, and the differences from FIG. 2 will be mainly explained below.

The receiving apparatus 1a of FIG. 5 differs from the receiving apparatus 1 of FIG. 2 only with respect to the internal configuration of the interference cancellation part 6. Specifically, the interference cancellation part 6 of FIG. 5 newly adds an interference amount calculation part 16 to the internal configuration of the interference cancellation part 6 of FIG. 2.

The interference amount calculation part 16 calculates the interference amount of the front interference component of the target frame caused by the preceding frame and the interference amount of the rear interference component of the target frame caused by the subsequent frame. Then the nulling part 14 nulls the larger of the two.

FIG. 6 shows timing diagrams explaining the processing operation of the interference cancellation part 6 according to the third embodiment. FIG. 6A shows an example in which a preceding wave and a group of three (paths) delay waves exist. When the frame header is removed by the FH removal part 13, the result is as shown in FIG. 6B. In FIG. 6B, the front interference component and the rear interference component are shown with bold outlines. The interference amount calculation part 16 calculates the interference amount of the front interference component and the interference amount of the rear interference component by the area of these bold outlines.

Figure 6A:
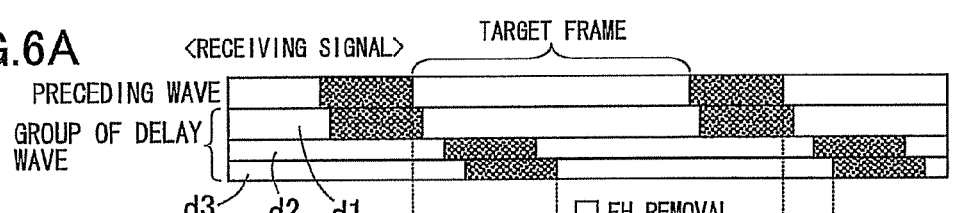
FIGS. 6A to 6D are timing diagrams explaining the processing operation of the interference cancellation part 6 according to the third embodiment.
Figure 6B:
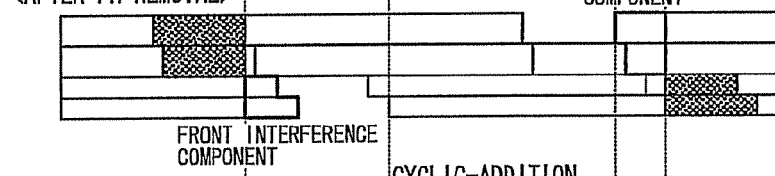
Figure 6C:
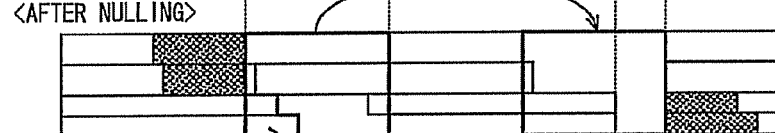
Figure 6D:
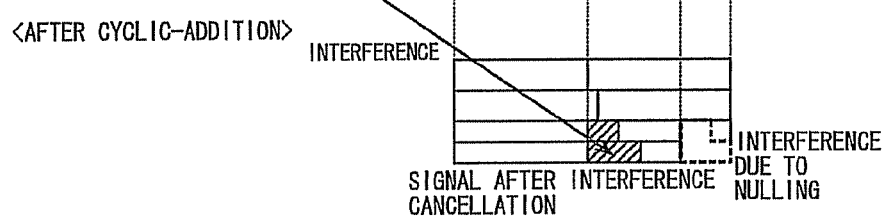

In the case of FIG. 6B, since the interference amount of the rear interference component is larger, the nulling part 14 nulls the rear interference component as shown in FIG. 6C. Subsequently, by performing cyclic-addition with the cyclic-addition part 15, the interference of the preceding wave becomes zero as shown in FIG. 6D, and interference due to nulling with the front interference caused by the preceding frame is incorporated into the interference wave group.

Figure 7:
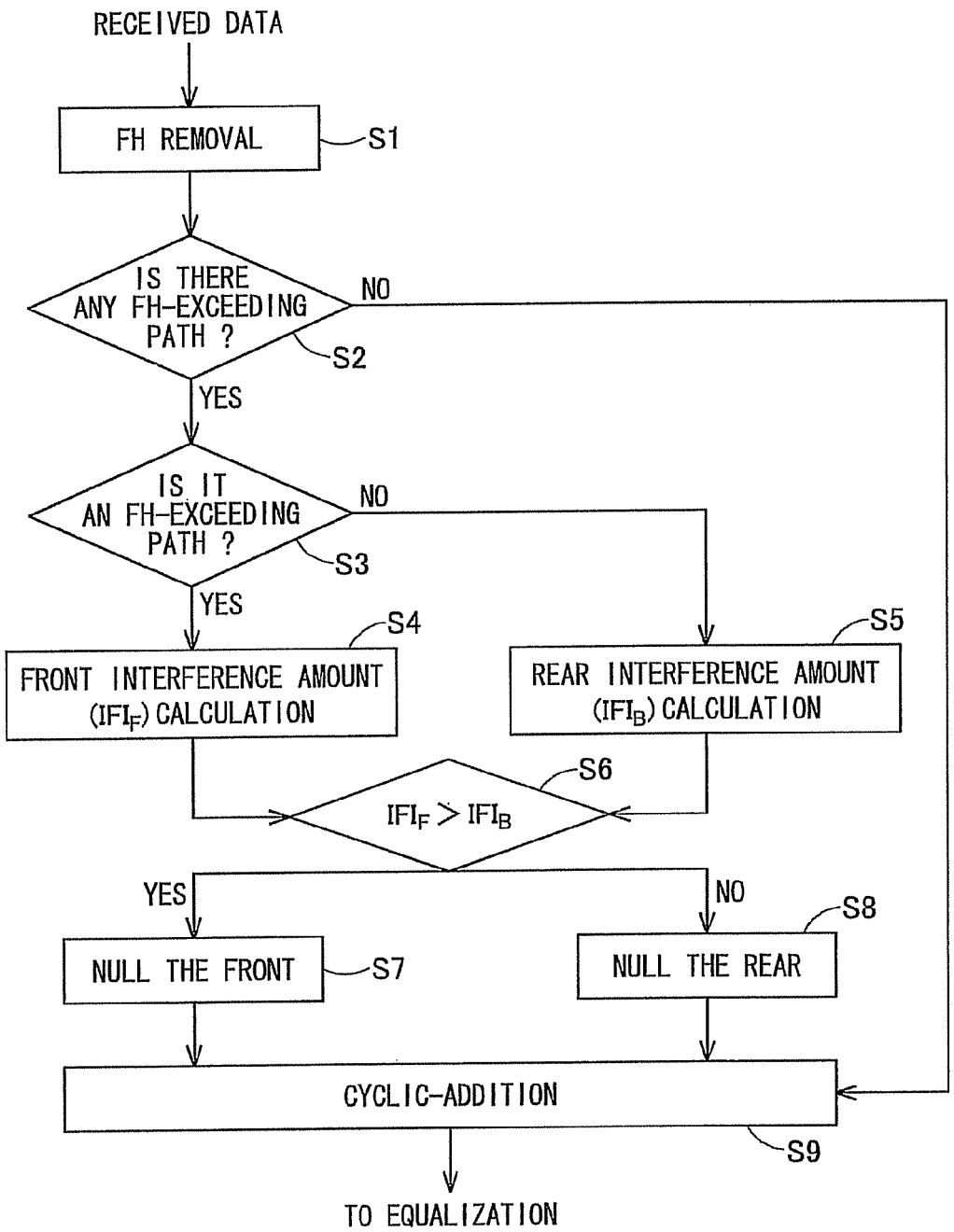
FIG. 7 is a flowchart showing the processing operation of the interference cancellation part 6 according to the third embodiment.
Figure 8A:
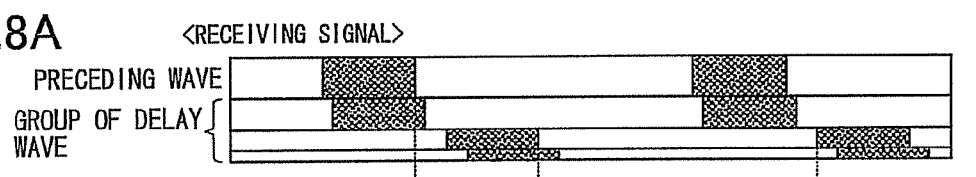
FIGS. 8A to 8D are timing diagrams of the result of processing by the interference cancellation part 6 according to a fourth embodiment.
Figure 8B:
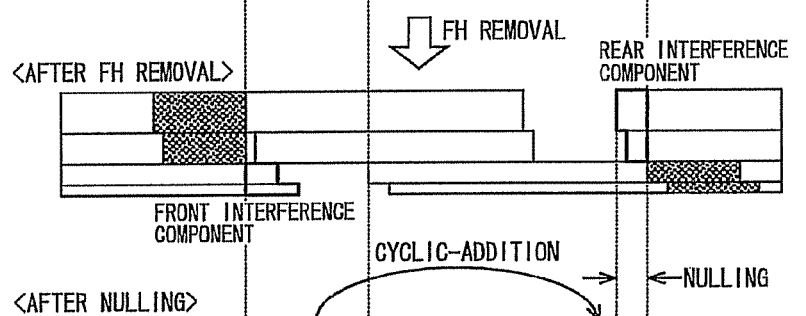
Figure 8C:
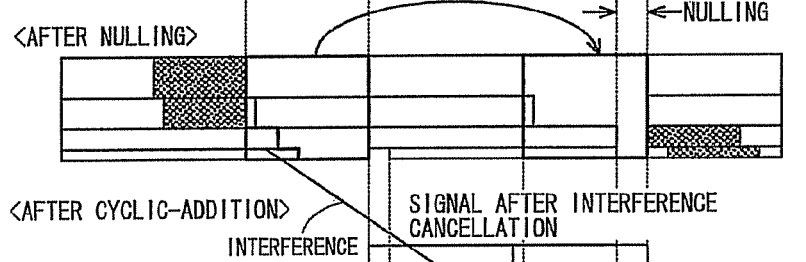
Figure 8D:
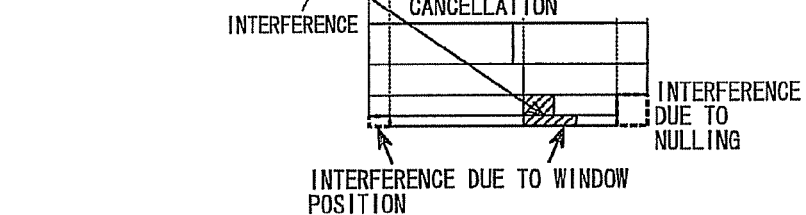
Figure 10A:
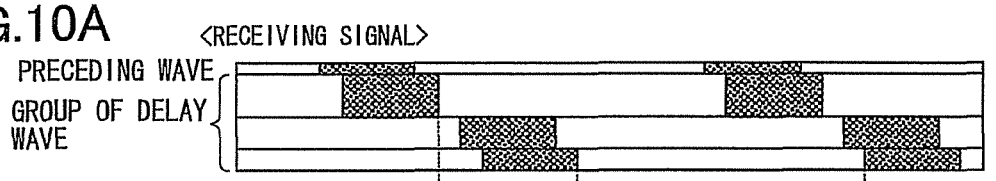
FIGS. 10A to 10D are timing diagrams in the case that a rear interference component is nulled.
Figure 10B:
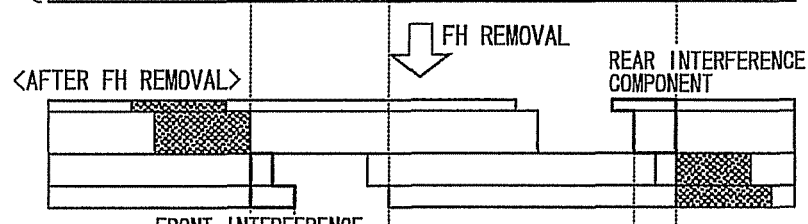
Figure 10C:
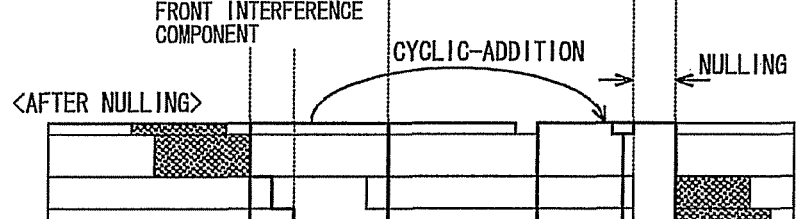
Figure 10D:
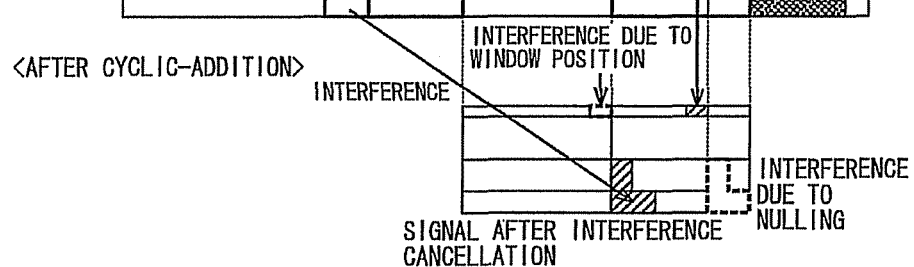

FIG. 7 is a flowchart showing the processing operation of the interference cancellation part 6 according to the third embodiment. First, the FH portion is removed by the FH removal part 13 (step S1). The process of step S1 is the same as in the first and second embodiments, and it will be explained in detail below.

First, the FH replica generation part 12 multiplies a signal of the known frame header by the channel estimate to generate an FH replica. Next, the FH removal part 13 removes the FH portion from the target frame for each path. More specifically, the FH portion to be removed is the FH portion of each path included in the time period starting from the beginning of the frame body of the most preceding wave to the end of the frame body of the longest delay wave.

Next, it is determined whether or not any path of a delay wave exceeding the frame header exists (step S2). If the path exists, it is determined whether it is a path exceeding the frame header for each path (step S3).

If it is determined to be a path exceeding the frame header in step S3, the front interference amount $IFI_F$ is calculated (step S4). If it is determined to be a path which does not exceed the frame header, the rear interference amount $IFI_B$ is calculated (step S5).

The processes of steps S3 to S5 will now be explained using the timing diagrams of FIG. 6. In the case of FIG. 6, the two paths of the preceding wave and the delay wave d1 are determined to be paths which do not exceed the frame header in step S3, and thus the rear interference amount $IFI_B$ is calculated for these two paths. Further, the two paths of delay waves d2 and d3 are determined to be paths exceeding the frame header in step S3, and thus the front interference amount $IFI_F$ is calculated for these two paths.

The calculation formulas for the rear interference amount $IFI_B$ and the front interference amount $IFI_F$ are expressed by the following formulas (1) and (2).

$$IFI_B = \sum_{l=0}^{M-1} p_l \times (t_{L-1} - t_l - t_{FH}) \tag{1}$$

$$IFI_F = \sum_{l=M}^{L-1} p_l \times (t_l - t_0 - t_{FH}) \tag{2}$$

Herein, M is the number of paths in which the delay amount is equal to or less than the FH length and L is the total number of paths. The delay time of each path are represented in ascending order by $t_0, t_1, t_2, \ldots, t_{L-1}$, and the powers thereof are represented by $p_0, p_1, p_2, \ldots, p_{L-1}$. The frame header length is $t_{FH}$.

Step S3 calculates the front interference amount or the rear interference amount with the paths exceeding the frame header and the paths which do not exceed the frame header.

Next, the front interference amount $IFI_F$ and the rear interference amount $IFI_B$ are compared, and it is determined whether $IFI_F > IFI_B$ (step S6). If $IFI_F > IFI_B$, the entire signal in the time period where the front interference component exists is nulled (step S7). Conversely, if $IFI_F \leq IFI_B$, the entire signal in the time period where the rear interference component exists is nulled (step S8).

After nulling, the front portion of the target frame is cyclically-added to the rear portion by the cyclic-addition part 15 (step S9).

As explained above, since FIG. 6 shows an example in which the rear interference portion is nulled, the result after performing cyclic-addition is that the rear interference amount $IFI_F$ calculated by the above-described formula (1) is forcefully nulled, and an interference of two times the front interference amount $IFI_F$ calculated by the above-described formula (2) is incorporated into the delay waves d2, d3. On the other hand, no interference is incorporated into the preceding wave and the delay wave d1.

The cyclic-addition part 15 may add the rear portion of the target frame to the front portion instead of adding the front portion of the target frame to the rear portion. In this case, the position of the interference component caused by the preceding frame changes, but the interference amount does not change, and thus the performance is the same.

In this way, in the third embodiment, regardless of whether the preceding wave's power or the delay wave's power is greater, the inter-frame interference of the wave with the greater power can be removed. Therefore, sudden increases in the ratio of desired wave power to undesired wave power (DUR) required to satisfy a specified bit error rate can be prevented.

Further, the calculation processes of the front interference amount $IFI_F$ and the rear interference amount $IFI_B$ shown in formulas (1) and (2) above are executed based on the channel estimated, and these processes can be executed in parallel with the frame header removal process. The interference cancellation part 6 can execute the process in FIG. 7 at high speed, inhibit processing delays, and avoid the possibility of causing any data delays.

Fourth Embodiment

In the first to third embodiments, the rear interference component was set to match the longest delay wave, but in the fourth embodiment, the front (back) interference component is set to match a delay wave which is not the longest delay wave.

The receiving apparatus 1a according to the fourth embodiment has the same configuration as that shown in FIG. 5, and only the processing operation of the interference cancellation part 6 is different. Thus, the following explanation will focus on the processing operation of the interference cancellation part 6.

FIGS. 8 and 9 are timing diagrams of the result of processing by the interference cancellation part 6 according to the fourth embodiment. FIGS. 8 and 9 differ from FIG. 6 in that the rear interference component is regarded by setting the end of a delay wave which is not the longest delay wave as a base point. The reason for this setting of the base point is that, in the case that the power of the longest delay wave is remarkably smaller compared to the power of other paths, if the rear interference component is regarded with the end of the longest delay wave being as a base point and then nulled and cyclically-added, the interference component of the delay wave would actually increase due to cyclic-addition. Therefore, when the rear interference component is regarded, it is preferable to ignore delay waves having remarkably small power and set the end of a delay wave having a rather large power as a base point. Thereby, the interference of the delay wave does not get so large.

However, as shown in FIG. 8, if the rear interference component is regarded with the end of a delay wave which is not the longest delay wave being a base point, in addition to the interference due to nulling with the front interference component, interference also occurs due to a portion from the end of the delay wave d2 used for setting the front (back) interference component (hereinafter referred to as the window position) to the end of the longest delay wave d3. Below, this interference will be called interference due to the window position.

In this way, by setting the window position to be before the end of the longest delay wave, the rear interference component caused by the delay waves can be reduced. Therefore, if the interference due to the window position of the longest delay wave is small, the interference amount can be reduced as a result.

FIG. 8 shows an example in which the rear interference component is nulled, but FIG. 9 shows an example in which the front interference component is nulled. In the case of FIG. 9, the front interference component is nulled with the delay wave d2 which is not the longest delay wave as the window position, and interference due to the window position occurs between the window position and the end of the longest delay wave (FIG. 9C). Therefore, if cyclic-addition is subsequently carried out, the rear interference component, the interference due to nulling, and the interference due to the window position mix together in the preceding wave and the group of delay waves (FIG. 9D).

As can be understood from FIGS. 8 and 9, the amount of interference due to the window position is the same regardless of whether the front interference component or the rear interference component is nulled.

Meanwhile, FIG. 10 shows timing diagrams in the case the power of the most preceding wave is remarkably smaller than the other paths. In this case, it is preferable to ignore the most preceding wave when nulling and cyclic-addition are carried out. In FIG. 10, the preceding wave is ignored and nulling and cyclic-addition is performed on the portion until the end of the longest delay wave by setting the beginning position of the next delay wave d1 as the base point.

In this case, interference occurs due to the preceding wave which was ignored rather than due to the longest delay wave. This interference is also interference due to the window position.

FIG. 10 shows an example in which the rear interference component is nulled, but even in the case that the front interference component is nulled, the amount of interference due to the window position caused by the preceding wave which was ignored is the same.

Therefore, in the case that the cyclic-addition and window setting are carried out ignoring X number of paths (X is an integer of 1 or more) in order from the smallest delay amount and Y number of paths (Y is an integer of 1 or more) in order from the largest delay amount, the interference amount caused by these is the same regardless of which portion is nulled. Thus, even if the window position which is the reference for nulling is not considered, the interference amount can be calculated. Therefore, the rear interference amount $IFI_B$ and the front interference amount $IFI_F$ in the case that the cyclic-addition and window setting are carried out ignoring X number of paths (X is an integer of 1 or more) in order from the smallest delay amount and Y number of paths (Y is an integer of 1 or more) in order from the largest delay amount are expressed by the following formulas (3) and (4).

$$IFI_B = \sum_{I=X}^{M-1} p_1 \times (t_{L-Y-1} - t_1 - t_{FH}) \quad (3)$$

$$IFI_F = \sum_{I=M}^{L-Y-1} p_1 \times (t_1 - t_X - t_{FH}) \quad (4)$$

The parameters in formulas (3) and (4) are the same as those for formulas (1) and (2) explained above. The conditions for nulling are follows.

When $IFI_B \geq IFI_F$, the nulling part 14 nulls the entire signal in the time period where the rear interference component exist, and when $IFI_B < IFI_F$, it nulls the entire signal in the time period where the front interference component exist.

The cyclic-addition part 15 cyclically adds the beginning portion of the target frame to the end portion. Subsequently, interference cancellation is carried out by the interference cancellation part 6, and then compensation on the multi-path channel is carried out by the equalization part 7. Next, after the processing of the time deinterleaving part 8, a soft metric is calculated by the soft output calculation part 9. Afterwards, error correction is carried out by the error correction decoding part 10.

In this way, the fourth embodiment sets the front interference component and the rear interference component ignoring a portion of the delay waves or preceding waves, and sets the end of a delay wave other than the preceding wave or longest delay wave as the window position to carry out nulling and cyclic-addition. Therefore, if the power of the preceding wave or the longest delay wave is remarkably smaller than the power of other paths, there is no disadvantage in that the amount of interference due to the preceding wave or the longest delay wave increases.

Fifth Embodiment

The fifth embodiment includes the third and fourth embodiments explained above, but also finds conditions in which the amount of interference reaches a minimum by ignoring a number of waves among the preceding wave and the group of delay waves, and then determines which to null the front interference component or the rear interference component with these conditions.

The receiving apparatus 1a according to the fifth embodiment is the same as that in FIG. 5, and only the processing operation of the interference cancellation part 6 is different. Thus, the following explanation will focus on the processing operation of the interference cancellation part 6.

Figure 11A:
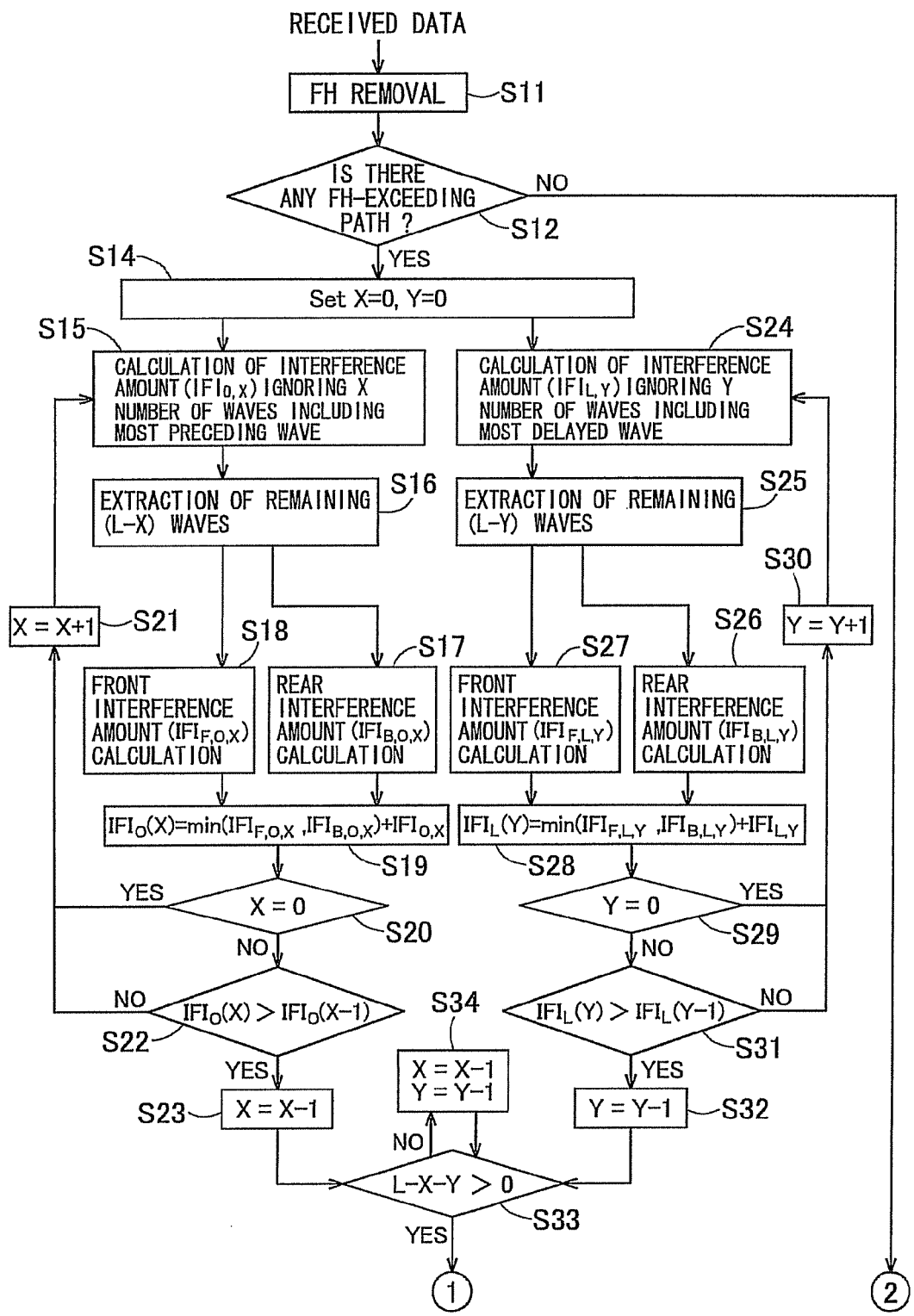
FIG. 11A is a flowchart showing the processing operation of the interference cancellation part 6 according to a fifth embodiment.
Figure 11B:
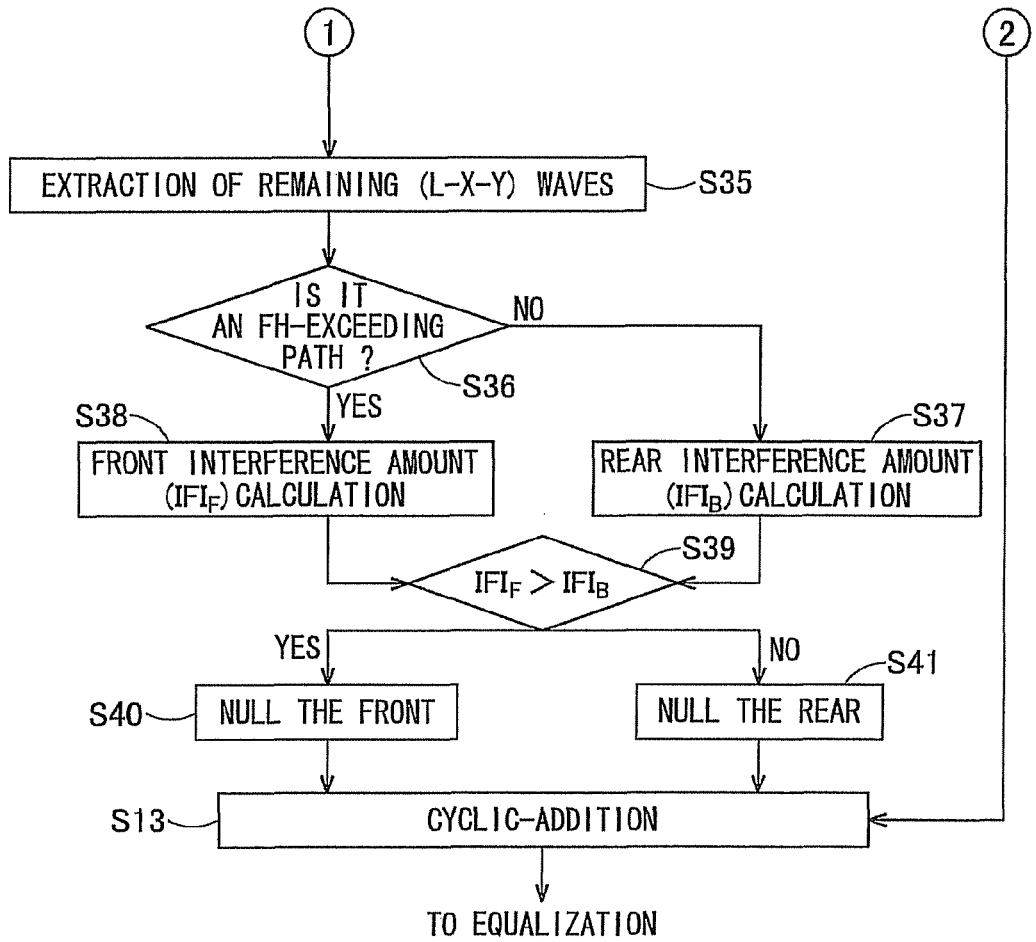
FIG. 11B is a flowchart that continues from FIG. 11A.

FIGS. 11A and 11B are flowcharts showing the processing operation of the interference cancellation part 6 according to the fifth embodiment. First, the FH portion is removed by the FH removal part 13 based on the propagation path estimated value (step S11). Next, it is determined whether or not any delay wave exceeding the frame header exists (step S12). If any delay wave does not exist, the cyclic-addition part 15 performs cyclic-addition in the same way as in a conventional apparatus (step S13).

On the other hand, if a delay wave exceeding the frame header exists, the number X of preceding waves to be ignored and the number Y of delay waves to be ignored are each initialized to null (step S14). Subsequently, in steps S15 to S22, processing to set the number X of preceding waves to be ignored is carried out, and in steps S23 to S30, processing to set the number Y of delay waves to be ignored is carried out. The processing of steps S15 to S22 can be carried out in parallel with the processing of steps S23 to S30 or the processings can be carried out sequentially. In this case, either processing can be carried out first.

In more detail, first, the interference amount $IFI_{0,X}$ occurred when an X number of preceding waves (X is an integer of 0 or more) in order from the smallest delay amount are ignored is calculated (step S15). This interference amount $IFI_{0,X}$ is expressed by the following formula (5).

$$IFI_{0,X} = \sum_{I=0}^{X-1} p_1 \times (t_x - t_1) \quad (5)$$

Herein, if X=0, this means that the most preceding wave is not ignored, and $IFI_{0,X}=0$ without executing the calculation of formula (5).

Next, the remaining number (L-X) of waves after the X waves which were ignored have been removed is extracted (step S16), and the rear interference component $IFI_{B,0,X}$ and the front interference component $IFI_{F,0,X}$ are calculated (step S17, S18, X-excluded interference amount calculation part). The rear interference component $IFI_{B,0,X}$ is calculated based on the following formula (6), and the front interference component $IFI_{F,0,X}$ is calculated based on the following formula (7).

$$IFI_{B,0,X} = \sum_{I=X}^{M-1} p_1 \times (t_{L-1} - t_1 - t_{FH}) \quad (6)$$

$$IFI_{F,0,X} = \sum_{I=M}^{L-1} p_1 \times (t_1 - t_x - t_{FH}) \quad (7)$$

Next, based on the above formulas (5) to (7), the estimated total of the interference amount after cyclic-addition is calculated based on the following formula (8) (step S19).

$$IFI_0(X) = \min(IFI_{F,0,X}, IFI_{B,0,X}) + IFI_{0,X} \quad (8)$$

In this formula (8), the interference amount $IFI_{0,X}$ of the preceding wave is added to the smaller of the front interference component $IFI_{F,0,X}$ and the rear interference component $IFI_{B,0,X}$, and this becomes the estimated total $IFI_0(X)$ of the interference amount after cyclic-addition.

The actual interference amount is double the value calculated by formula (8).

The calculations of formulas (5) to (8) shown in steps S15 to S19 explained above are repeated from X=0 while incrementing X by 1 (steps S20, S21). When the total $IFI_0(X)$ of the interference amount surpasses the immediately preceding total $IFI_0(X-1)$ (step S22), the repetition is stopped, and X=−1 when the interference amount reaches a minimum is set as the number of preceding waves to be ignored (step S23, X selection part).

The setting of the number Y of delay waves to be ignored among the delay waves is carried out by the same procedure as that of steps S15 to S23 (steps S24 to S32). The interference amount that occurs in the case that a Y number of delay waves in order from the largest delay amount are ignored, as calculated in step S24, is calculated by the following formula (9).

$$IFI_{L,Y} = \sum_{1=L-Y}^{L-1} p_1 \times (t_{L-1} - t_1) \qquad (9)$$

Herein, if Y=0, the most preceding wave is not ignored, and thus $IFI_{0,Y}=0$ without executing the calculation of formula (9).

The rear interference component $IFI_{B,L,Y}$ calculated in step S26 is calculated by the following formula (10).

$$IFI_{B,L,Y} = \sum_{1=0}^{M-1} p_1 \times (t_{L-Y-1} - t_1 - t_{FH}) \qquad (10)$$

The front interference component $IFI_{F,L,Y}$ calculated in step S27 is calculated by the following formula (11).

$$IFI_{F,L,Y} = \sum_{1=M}^{L-Y-1} p_1 \times (t_1 - t_0 - t_{FH}) \qquad (11)$$

Steps S26 and S27 correspond to the Y-excluded interference amount calculation part. Thereby, the estimated total $IFI_L(Y)$ of the interference amount after cyclic-addition, as calculated in step S28, is calculated by the following formula (12).

$$IFI_L(Y) = \min(IFI_{F,L,Y}, IFI_{B,L,Y}) + IFI_{0,Y} \qquad (12)$$

In terms of Y as well, the calculations of the above formulas (9) to (12) are repeated from Y=0 while incrementing Y by 1. When the total $IFI_L(Y)$ of the interference amount surpasses the immediately preceding total $IFI_L(Y-1)$ (step S31), the repetition is stopped, and Y=Y-1 when the interference amount reaches a minimum is set as the number of delay waves to be ignored (step S32, Y selection part).

As explained above, in order to minimize the interference, the number X of preceding waves to be ignored and the number Y of delay waves to be ignored are set. Then, the rear interference component and the front interference component are calculated using the paths of the remaining number L-X-Y.

First, it is determined whether the entire remaining number (L-X-Y) is greater than 0 (step S33). If it is 0 or less, X and Y are decremented one by one (step S34) and the determination of step S33 is performed again. In other words, the processes of steps S33 and S34 are repeated until L-X-Y becomes greater than 0.

Next, the paths of the remaining number L-X-Y are extracted (step S35). It is then determined whether a delay wave exceeding the frame header exists among the extracted paths (step S36). If any delay wave does not exist, the rear interference amount $IFI_B$ is calculated based on the following formula (13) (step S37). If the delay wave exists, the front interference amount $IFI_F$ is calculated based on the following formula (14) (step S38).

$$IFI_B = \sum_{1=X}^{M-1} p_1 \times (t_{L-Y-1} - t_1 - t_{FH}) \qquad (13)$$

$$IFI_F = \sum_{1=M}^{L-Y-1} p_1 \times (t_1 - t_X - t_{FH}) \qquad (14)$$

Next, it is determined whether the front interference amount $IFI_F$ is greater than the rear interference amount $IFI_B$ (step S39). If $IFI_F > IFI_B$, the front interference component is nulled (step S40), and if $IFI_F \leq IFI_B$, the rear interference component is nulled (step S41). Cyclic-addition is then carried out (step S42).

In this way, in the fifth embodiment, the conditions for minimizing the interference amount are searched by ignoring a number of waves among the preceding waves and the delay waves, the number X of preceding waves and the number Y of delay waves that fulfill the conditions are ignored, the front interference amount and the rear interference amount are calculated using the remaining preceding waves and delay waves, and then it is determined which to null the front or the rear in accordance with the interference amount.

Alternatively, the front interference segment and the rear interference segment can both be nulled without calculating the front interference amount and the rear interference amount (steps S37 and S38) and comparing them (step S39). Thereby, the processing procedure can be simplified and the processing speed can be enhanced compared to the processing in FIGS. 11A and 11B explained above.

By the fifth embodiment, in the case that there is a path in the preceding waves and the delay waves that has a remarkably small power, unnecessary increases in interference due to such a path can be prevented. Therefore, regardless of what kind of paths are included in the preceding waves and the delay waves, the amount of interference after cyclic-addition can be reduced and the demodulation performance can be improved.

Sixth Embodiment

In the sixth embodiment, after nulling by one of the methods in the first to fifth embodiments explained above, the signal in the time period where interference existed before nulling is replaced with an FB replica, which is a replica of the frame body, and then cyclic-addition is carried out.

Figure 12:
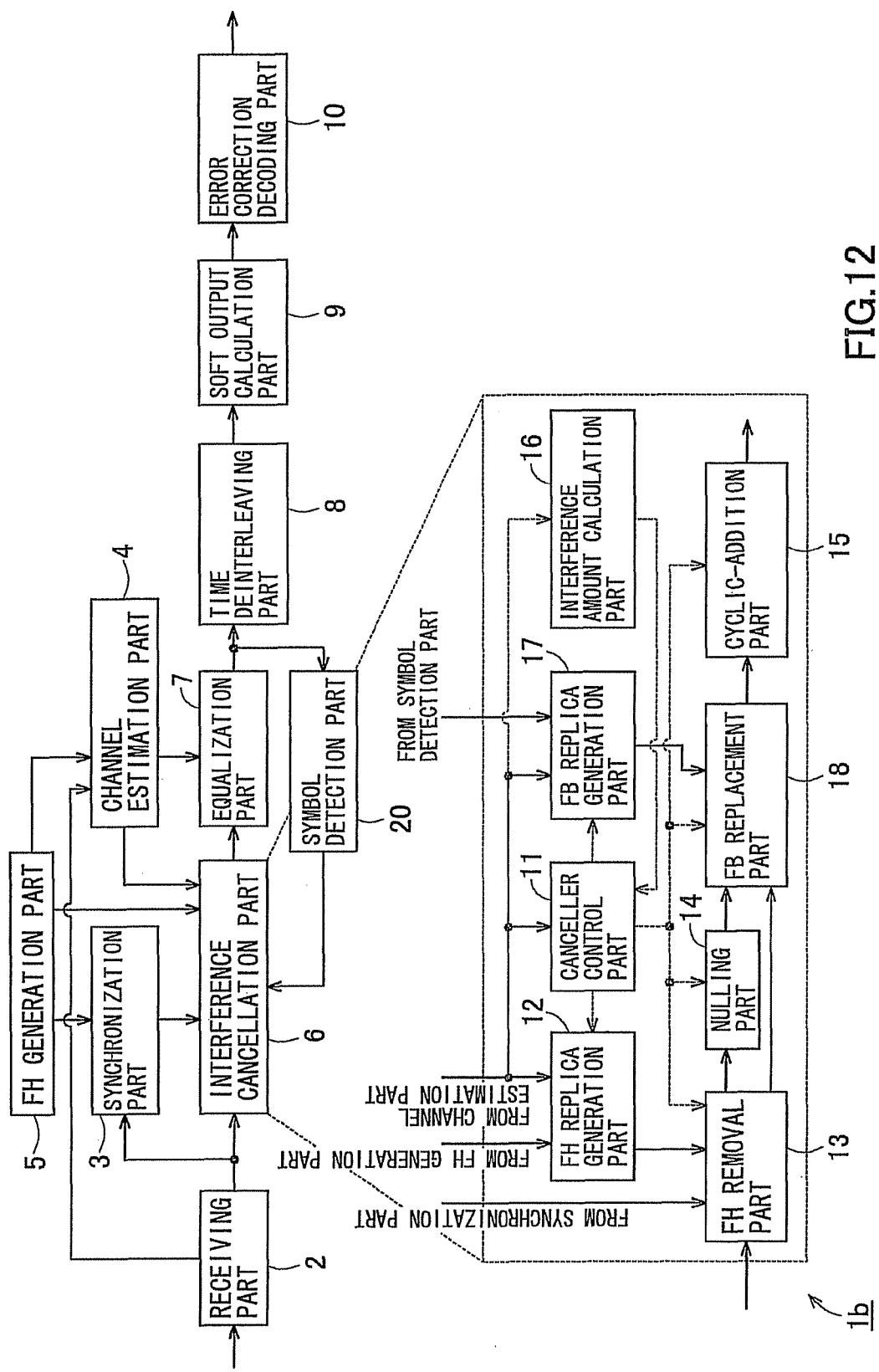
FIG. 12 is a block diagram showing the overall configuration of a receiving apparatus 1b according to a sixth embodiment.

FIG. 12 is a block diagram showing the overall configuration of a receiving apparatus 1b according to the sixth embodiment. In FIG. 12, parts which are common to FIG. 5 are given the same reference numeral, and the differences from FIG. 5 will be mainly explained below.

The receiving apparatus 1b of FIG. 12 includes a symbol detection part 20 in addition to the configuration of FIG. 5. The symbol detection part 20 estimates transmitted symbols included in the baseband signal referring to the symbol equalized by the equalization part 7. The estimated symbols are applied to the interference cancellation part 6.

The interference cancellation part 6 in FIG. 12 includes the following in addition to the constituent elements of the interference cancellation part 6 in FIG. 5: an FB replica generation part (a second replica generation part) 17 that generates a replica of the frame body, and an FB replacement part 18 that replaces the segment including the interference after nulling with the FB replica. Further, similar to the interference cancellation part 6 in FIG. 8, an interference amount calculation part 16 can be provided within the interference cancellation part 6 of FIG. 12.

The interference cancellation part 6 of FIG. 12 performs removal of the frame header, nulling, and cyclic-addition by the same procedure as one of the interference cancellation parts 6 of the first to fifth embodiments explained above. At this time, if nulling has already been executed, the FB replacement part 18 accepts an output signal of the nulling part 14, and if nulling has not yet been executed, the FB replacement part 18 accepts an output signal of the FH removal part 13, and then outputs the accepted output signal as is to the cyclic-addition part 15 and also retains the signal.

Next, the equalization part 7 carries out channel equalization referencing the channel estimates on the output of the interference cancellation part 6, and then inputs the output to the symbol detection part 20. The symbol detection part 20 then estimates the transmitted symbols referencing the equalized symbols.

For example, if the transmitted signal is a single-carrier signal, the FB replica generation part 17 multiplies the estimated symbols by the channel estimates to generate an FB replica, and if the transmitted signal is a multi-carrier signal, the FB replica generation part 17 converts the estimated symbols to a time domain signal by IDFT (Inverse Discrete Fourier Transform) and the multiplies it by the channel estimates to generate an FB replica.

After the frame header has been removed by the FH removal part 13 or after nulling by the nulling part 14, the FB replacement part 18 uses the FB replica as a signal of a segment in which inter-frame interference existed within the target frame. Subsequently, cyclic-addition and equalization are performed again, and then the latter stage processing such as time deinterleaving is carried out.

By the above process, it is possible to remove inter-frame interference which could not be removed by the nulling and cyclic-addition processes explained in the first to fifth embodiments, and thus the demodulation performance can be improved.

FIG. 13 shows timing diagrams of interference cancellation according to the sixth embodiment. Similar to FIG. 8, these timing diagrams show an example in which nulling and cyclic-addition are carried out with the end of the delay wave d2, which is not the longest delay wave, as the window position. In the case that the processing by the FB replacement part 18 is not carried out, as shown in FIG. 13C, after cyclic-addition, the front interference component, interference due to nulling, and interference due to the window position are included.

Figure 13A:
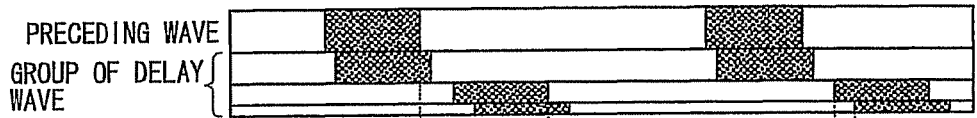
FIGS. 13A to 13F are timing diagrams of interference cancellation according to the sixth embodiment.
Figure 13B:
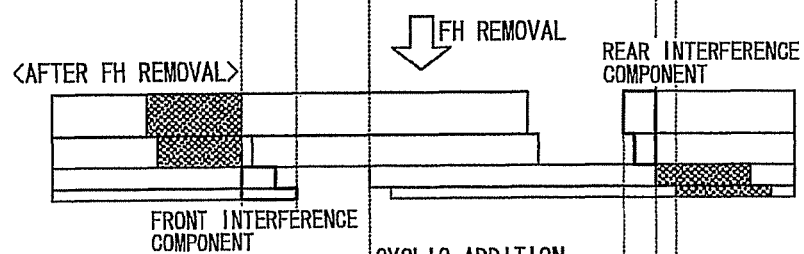
Figure 13C:
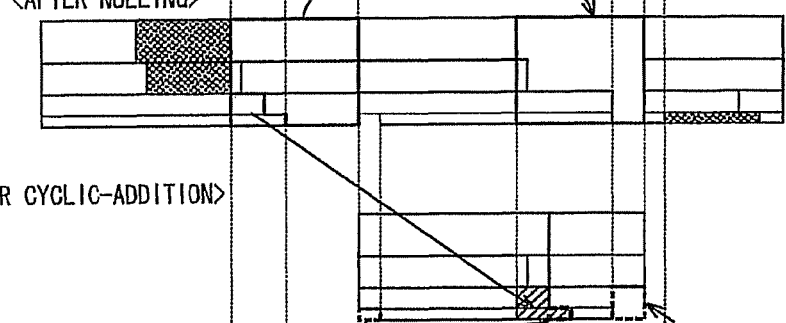
Figure 13D:
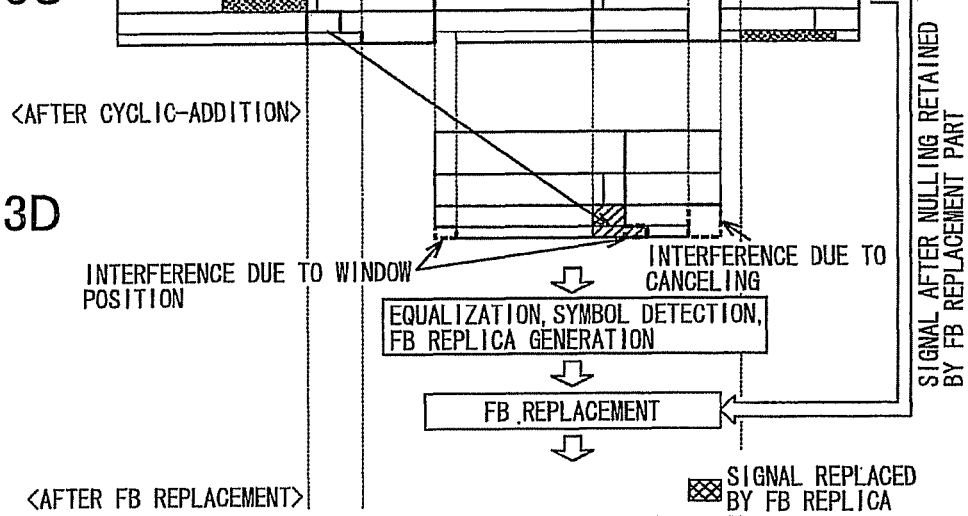
Figure 13E:
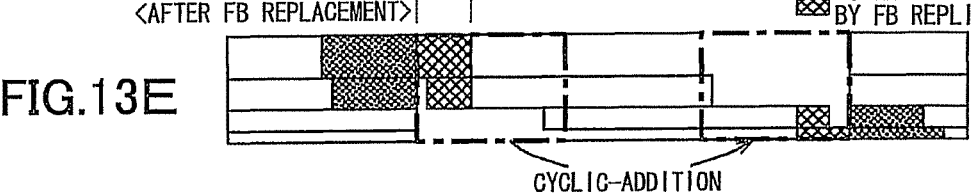
Figure 13F:
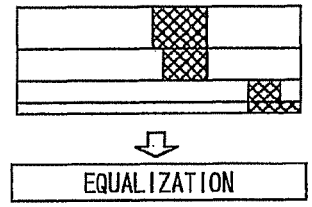

In this state, after the equalization part 7, the symbol detection part 20, and the FB replica generation part 17 have executed their respective processes, when the FB replacement part 18 performs FB replacement, the front interference component, interference due to nulling, and interference due to the window position are replaced by the FB replica. As a result, as shown in FIG. 13D, all the interference is removed. Subsequently, cyclic-addition and equalization are carried out again.

In this way, in the sixth embodiment, in the case that the front (back) interference component, interference due to nulling, and interference due to the window position are included in the target frame after cyclic-addition, an FB replica is generated and the interference portions are replaced with the FB replica. Thus, after a subsequent cyclic-addition, all of the interference can be removed.

Seventh Embodiment

The seventh embodiment repeats the FB replacement process explained in the sixth embodiment.

The receiving apparatus 1b according to the seventh embodiment has the same configuration as shown in FIG. 12, and thus the following explanation will focus on the points of difference.

In the seventh embodiment, after nulling is carried out by one of the methods in the first to fifth embodiments explained above, the process for replacing the segment including interference with an FB replica is repeated multiple times, and then a final equalization process is performed.

This repeating process is carried out within an FB replacement loop. In the FB replacement loop, the respective processes of the equalization part 7, the symbol detection part 20, the FB replica generation part 17, and the FB replacement part 18 of FIG. 12 are repeated.

If inter-frame interference is included within the target frame at the time the frame header is removed from the target frame, the FB replacement part 18 replaces this interference portion with the most recent FB replica.

If the number of repetitions of the FB replacement loop is N times (N is an integer of 0 or more), the above-described replacement loop is carried out N times, and then cyclic-addition and equalization are performed, and subsequently the latter stage processing such as time deinterleaving is carried out. The process in the case of N=0 is the process of one of the first to fifth embodiments explained above, and the process in the case of N=1 is the process of the sixth embodiment explained above.

The number of repetitions N is determined by the following first or second method. In the first method, the number of repetitions N is determined considering the constraints of latency allowed until the final equalization process is carried out by the equalization part 7, and/or the expected performance under a multi-path and noise environment of interest, and the like. In the second method, the maximum number of repetitions is predetermined by the same standards as the first method, but a quality indicator such as an MER (Modulation Error Ratio) during the repetition operation is measured, and the repetitions are completed when a certain quality is exceeded.

In this way, in the seventh embodiment, even if there is a case in which the front (back) interference component, interference due to nulling, and interference due to the window position which could not be removed with only one FB replacement process are included, by repeatedly executing the FB replacement loop, all of the interference can be reliably removed, and the demodulation performance can be improved.

Eighth Embodiment

In the eighth embodiment, interference from the preceding frame body is removed using the FB replica.

Figure 14:
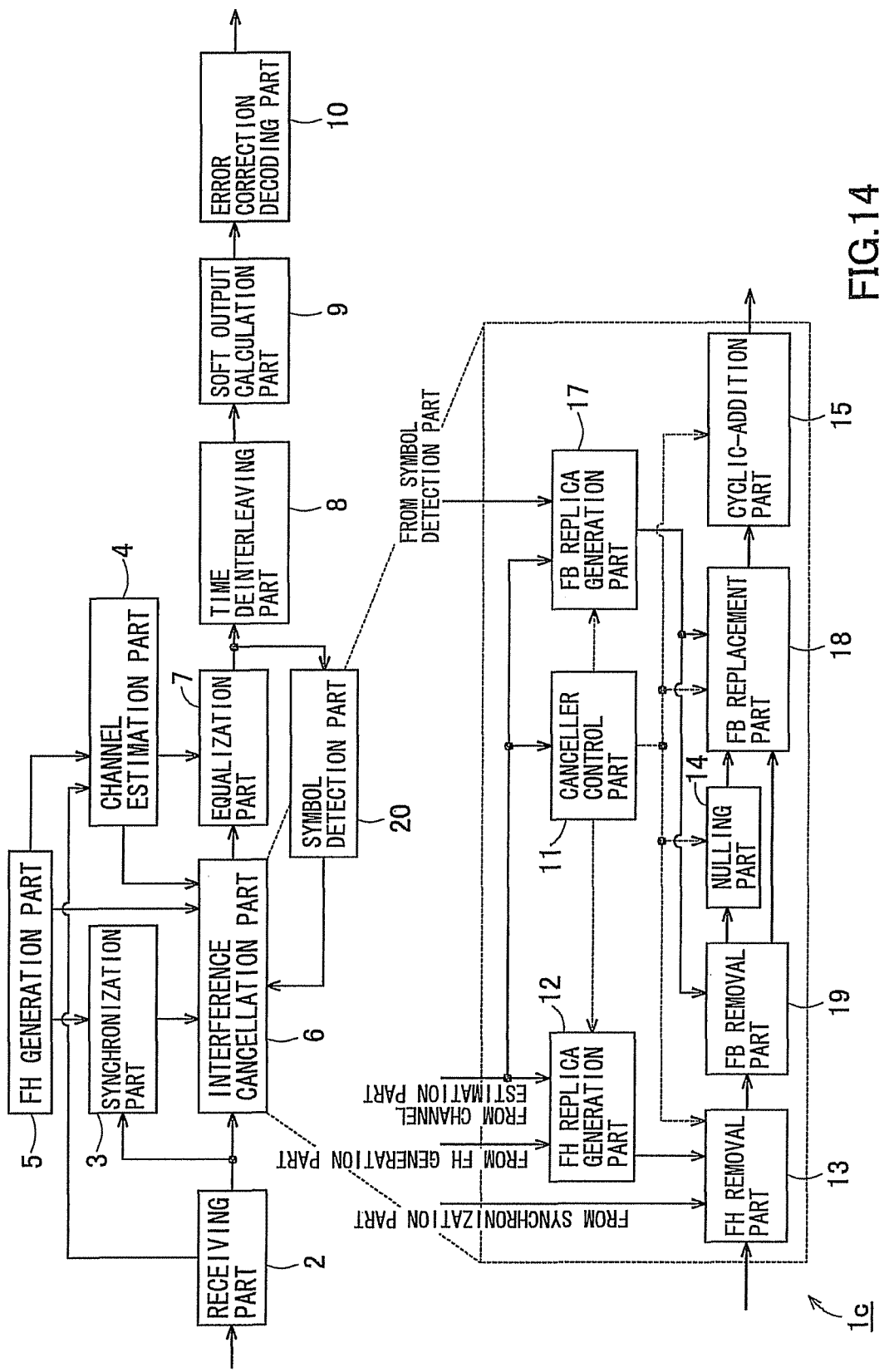
FIG. 14 is a block diagram showing the overall configuration of a receiving apparatus 1c according to an eighth embodiment.

FIG. 14 is a block diagram showing the overall configuration of a receiving apparatus 1c according to the eighth embodiment. FIG. 15 shows timing diagrams of interference cancellation according to the eighth embodiment. The receiving apparatus 1c of FIG. 14 is different from the receiving apparatus 1b of FIG. 12 only with respect to the configuration of the interference cancellation part 6.

The interference cancellation part 6 of FIG. 14 adds an FB removal part (front interference removal part) 19 to the interference cancellation part 6 of FIG. 12. After the frame header is removed by the FH removal part 13, the FB removal part 19 uses the FB replica to remove the front interference component from within the frame body. Therefore, as shown in FIG. 15, the front interference component no longer exists before nulling is performed by the nulling part 14.

After the front interference component within the target frame is removed by the FB removal part 19, nulling and cyclic-addition are carried out. Subsequently, FB replacement is performed by the FB replacement part 18. When FB replacement is carried out, since the front interference component does not exist, only the rear interference component is FB replaced as shown in FIG. 15.

Similar to the seventh embodiment, it is also possible to repeat the FB replacement loop in the eighth embodiment. If the FB replacement loop is to be repeated, there is a degree of freedom regarding which time's FB replica to use. An index representing the timing for generation of an FB replica is set as M (M is an integer of 0 or more), the symbol detection part 20 and the FB replica generation part 17 are operated on the output of the equalization part 7 after the FB replacement loop has repeated an M number of times, and the obtained FB replica is used for removal of the front interference component.

The FB replica generation index M is predetermined within a range which is equal to or less than the maximum number of repetitions of the FB replacement loop in the seventh embodiment, considering the constraints of latency allowed, the expected performance under a multi-path and noise environment of interest. If the set FB replica generation index M becomes less than the actual number of repetitions of the FB replacement loop, the symbol detection part 20 and the FB replica generation part 17 are operated after the execution of the final FB replacement loop and the obtained FB replica is used for removal of the front interference component.

When the front interference component is removed by the FB removal part 19, the removed interference component is not included when the interference amount is calculated.

Figure 16:
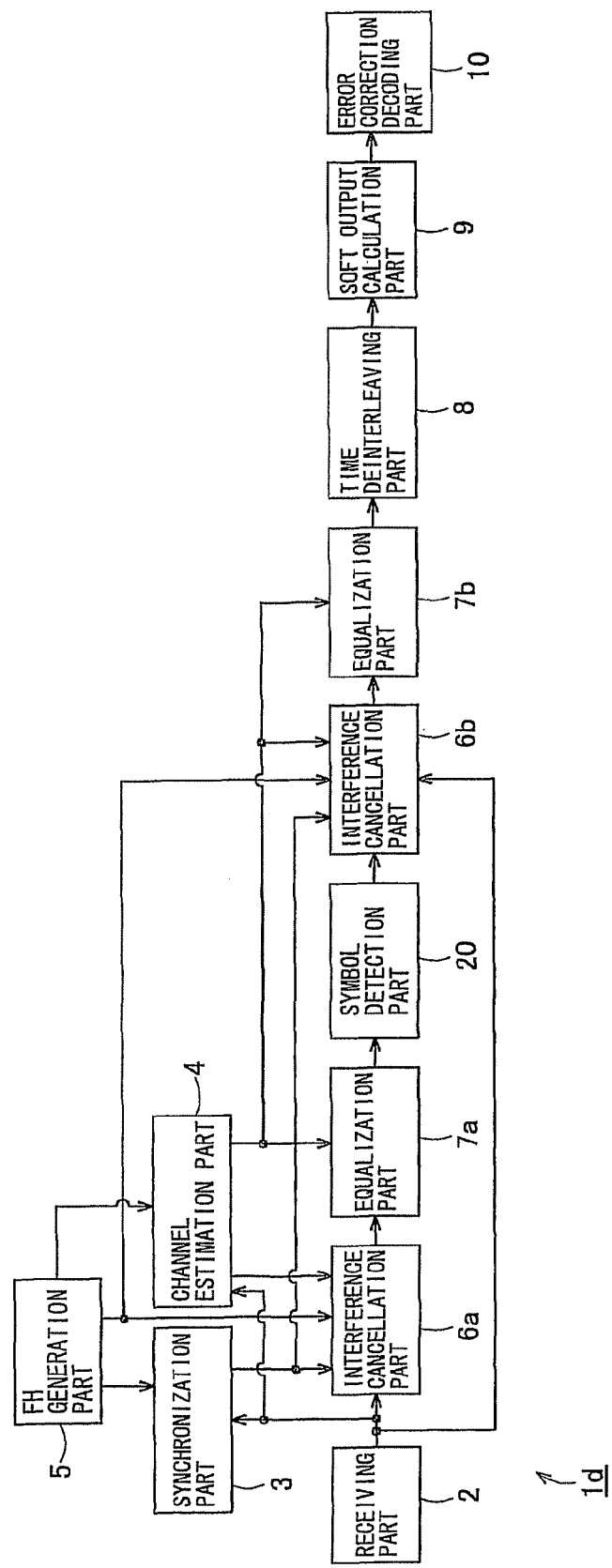
FIG. 16 is a block diagram showing the overall configuration of a receiving apparatus 1d which shows an alternate embodiment of FIG. 14.

FIG. 16 is a block diagram showing the overall configuration of a receiving apparatus 1d which shows an alternate embodiment of FIG. 14. The receiving apparatus 1d of FIG. 16 differs from the receiving apparatus 1c of FIG. 14 in that it includes two interference cancellation parts 6a and 6b and two equalization parts 7a and 7b. The interference cancellation part 6a of the former stage has the same internal configuration as the interference cancellation part 6 shown in FIG. 2 or 5. The interference cancellation part 6b of the latter stage has the same internal configuration as the interference cancellation part 6 of FIG. 14.

The interference cancellation part 6a of the former stage carries out nulling and cyclic-addition and then removes the interference, but the front (back) interference component and the interference due to nulling remain as they are.

The symbol detection part 20 estimates the transmitted symbols referencing symbols resulting from equalization of an output signal of the former-stage interference cancellation part 6a by the equalization part 7. The detection result of the symbol detection part 20 is supplied to the FB replica generation part 17 within the latter-stage interference cancellation part 6b, and an FB replica is generated. FB replacement is then carried out by the FB replacement part 18.

In this way, in the eighth embodiment, when the FB replacement loop is repeated to perform FB replacement, the interference from the preceding frame body is removed using the FB replica. Therefore, the inter-frame interference included within the target frame can be removed in a short amount of time.

At least a part of the receiving apparatuses 1, 1a, 1b, 1c, and 1d explained in the above embodiments can be composed of hardware or software. If it is composed of software, a program for executing at least a part of the functions of the receiving apparatuses 1, 1a, 1b, 1c, and 1d is stored onto a recording medium such as a flexible disk or a CD-ROM, and then this is read and executed by a computer. The recording medium is not limited to a removable medium such as a magnetic disk or optical disk, and can be a fixed type such as a hard disk device or memory.

Further, the program for executing at least a part of the functions of the receiving apparatuses 1, 1a, 1b, 1c, and 1d can be distributed via a telecommunication line (including wireless communication) such as the internet. In addition, the program can be encoded or modulated, and then distributed in a compressed state via a wired line or wireless line such as the internet, or stored in a compressed state on a recording medium for distribution.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A receiving apparatus configured to receive a digital modulation signal including a known signal and a data signal within a frame, comprising: a receiving part configured to down-convert the digital modulation signal to a baseband signal; a channel estimation part configured to estimate a multi-path channel based on the baseband signal and to obtain channel estimates; a first replica generation part configured to generate a first replica which is a replica of the known signal and is included in the baseband signal, based on the channel estimates obtained by the channel estimation part; a first replica removal part configured to remove the first replica from a target frame in the baseband signal; a nulling part configured to forcefully null the baseband signal for at least a portion of the time period where an inter-frame interference occurs due to a delay wave having a delay time longer than the known signal; and a cyclic-addition part configured to perform cyclic-addition between a front side portion and a rear side portion in the target frame, including the portion nulled by the nulling part.

2. The apparatus of claim 1, wherein when the target frame does not include the delay wave having the delay time longer than the delay time of the known signal, the cyclic-addition part removes the first replica and then performs cyclic-addition between the front side portion and the rear side portion in the target frame, without performing the nulling by the nulling part.

3. The apparatus of claim 1, further comprising an interference amount calculation part configured to calculate interference amount of the inter-frame interference existing in the target frame, wherein the nulling part determines a portion to be nulled in the target frame based on a result calculated by the interference amount calculation part.

4. The apparatus of claim 3, wherein the interference amount calculation part calculates the interference amount based on signals remained after removing X number of signals in order from a smallest delay amount, where X is an integer 1 or more, among a preceding wave signal and delay wave signals included in the baseband signal each having a different delay amount.

5. The apparatus of claim 3, wherein the interference amount calculation part calculates the interference amount based on signals remained after removing Y number of signals in order from a largest delay amount, where Y is an integer 1 or more, among a preceding wave signal and delay wave signals included in the baseband signal each having a different delay amount.

6. The apparatus of claim 3, further comprising: an X-excluded interference amount calculation part configured to calculate the interference amount based on the signals remained after removing X number of signals in order from a smallest delay amount, where X is an integer of 1 or more, among a preceding wave signal and delay wave signals included in the baseband signal each having a different delay amount; a Y-excluded interference amount calculation part configured to calculate the interference amount based on the signals remained after removing Y number of signals in order from a largest delay amount, where Y is an integer of 1 or more, among a preceding wave signal and delay wave signals included in the baseband signal each having a different delay amount; an X selection part configured to calculate the interference amount by the X-excluded interference amount calculation part while changing a value of the X to select the X number of signals when the interference amount becomes minimum; and a Y selection part configured to calculate the interference amount by the Y-excluded interference amount calculation part while changing a value of the Y to select the Y number of signals when the interference amount becomes minimum, wherein the interference amount calculation part calculates the interference amount based on signals remained by excluding the X number of signals selected by the X selection part and the Y number of signals selected by the Y selection part.

7. The apparatus of claim 1, further comprising: an equalization part configured to compensate the signal after the cyclic-addition for an influence of the multi-path channel estimated by the channel estimation part; a symbol detection part configured to estimate transmitted symbols included in an output signal of the equalization part; a second replica generation part configured to generate a second replica which is a replica of the data signal based on the transmitted symbols estimated by the symbol detection part and the channel estimates obtained by the channel estimation part; and a replacement part configured to replace a portion where an interference occurs with the second replica in the target frame after the nulling by the nulling part or after the first replica removal part removes the first replica, wherein the equalization part compensates the target frame after replaced by the replacement part, for the influence of the multi-path channel estimated by the channel estimation part.

8. The apparatus of claim 7, wherein the cyclic-addition part repeats multiple times a replacement process by the replacement part and then performs the cyclic-addition.

9. The apparatus of claim 7, further comprising a front interference removal part configured to remove a front interference component in the target frame by using the second replica generated by the second replica generation part in association with the preceding frame of the target frame.

10. The apparatus of claim 1, wherein the known signal is a frame header, and the data signal is a frame body.

11. A receiving method of receiving a digital modulation signal including a known signal and a data signal within a frame, the receiving method being performed by a receiver, comprising:
   down-converting the digital modulation signal to a baseband signal;
   estimating a multi-path channel based on the baseband signal to obtain channel estimates;
   generating a first replica which is a replica of the known signal included in the baseband signal, based on the estimated multi-path channel;
   removing the first replica from a target frame in the baseband signal;
   forcefully nulling the baseband signal for at least a portion of the time period where an inter-frame interference occurs due to a delay wave having a delay time longer than the known signal; and
   performing cyclic-addition between a front side portion and a rear side portion in the target frame, including the nulled portion.

12. The method of claim 11, wherein when the cyclic-addition is performed and the target frame does not include the delay wave having the delay time longer than the delay time of the known signal, the first replica is removed and then cyclic-addition is performed between the front side portion and the rear side portion in the target frame, without performing the nulling.

13. The method of claim 11, further comprising: calculating interference amount of the inter-frame interference existing in the target frame, wherein a portion nulled in the target frame is determined based on the calculated interference amount.

14. The method of claim 13, wherein the interference amount is calculated based on signals remained after removing X number of signals in order from a smallest delay amount, where X is an integer 1 or more, among a preceding wave signal and delay wave signals included in the baseband signal each having a different delay amount.

15. The method of claim 13, wherein the interference amount is calculated based on signals remained after removing Y number of signals in order from a largest delay amount, where Y is an integer 1 or more, among a preceding wave signal and delay wave signals included in the baseband signal each having a different delay amount.

16. The method of claim 13, further comprising: calculating a first interference amount based on the signals remained after removing X number of signals in order from a smallest delay amount, where X is an integer of 1 or more, among a preceding wave signal and delay wave signals included in the baseband signal each having a different delay amount; calculating a second interference amount based on the signals remained after removing Y number of signals in order from a largest delay amount, where Y is an integer of 1 or more, among a preceding wave signal and delay wave signals included in the baseband signal each having a different delay amount; calculating the first interference amount while changing a value of the X to select X number of signals when the first interference amount becomes minimum; and calculating the second interference amount while changing a value of the Y to select Y number of signals when the second interference amount becomes minimum, wherein the interference amount is calculated based on signals remained by excluding the X number of the selected signals and the Y number of the selected signals.

17. The method of claim 11, further comprising: compensating the signal after the cyclic-addition for an influence of the estimated multi-path channel; estimating transmitted symbols included in the compensated output signal; generating a second replica which is a replica of the data signal based on the estimated transmitted symbols and the channel estimates; and replacing a portion where an interference occurs with the second replica in the target frame after the nulling or after the removal of the first replica, wherein target frame after the replacement is compensated for the influence of the multi-path channel.

18. The method of claim 17, wherein a replacement process is repeated multiple times and then performs the cyclic-addition.

19. The method of claim 17, further comprising: removing a front interference component in the target frame by using the second replica in association with the preceding frame of the target frame.

20. The method of claim 11, wherein the known signal is a frame header, and the data signal is a frame body.

* * * * *